United States Patent
Sasaoka

(10) Patent No.: US 12,054,353 B2
(45) Date of Patent: Aug. 6, 2024

(54) SHEET CONVEYANCE APPARATUS AND IMAGE FORMING APPARATUS

(71) Applicant: CANON KABUSHIKI KAISHA, Tokyo (JP)

(72) Inventor: Osamu Sasaoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 17/890,128

(22) Filed: Aug. 17, 2022

(65) Prior Publication Data

US 2023/0058521 A1 Feb. 23, 2023

(30) Foreign Application Priority Data

Aug. 20, 2021 (JP) .................. 2021-134772

(51) Int. Cl.
*B65H 7/06* (2006.01)
*B65H 7/14* (2006.01)
(Continued)

(52) U.S. Cl.
CPC .......... *B65H 7/06* (2013.01); *B65H 7/14* (2013.01); *G03G 15/6529* (2013.01);
(Continued)

(58) Field of Classification Search
CPC ............ B65H 7/06; B65H 7/14; B65H 29/58; B65H 43/04; B65H 2511/528;
(Continued)

(56) References Cited

U.S. PATENT DOCUMENTS 6,199,853 B1 * 3/2001 Andoh ................. B42C 1/12
270/58.08
7,216,865 B2 * 5/2007 Tamura ................. B65H 29/58
271/213
(Continued)

FOREIGN PATENT DOCUMENTS

JP 2013-164610 A 8/2013
JP 2014-167613 A 9/2014
(Continued)

*Primary Examiner* — Leslie A Nicholson, III
(74) *Attorney, Agent, or Firm* — Canon U.S.A., Inc. IP Division

(57) ABSTRACT

A sheet conveyance apparatus includes a conveyance unit and first and second moving members respectively including first and second projection portions. When the first projection portion contacts a sheet, the first moving member is moved from a first projection position, where the first projection portion projects to a conveyance path, to a first retraction position, where the first projection portion is retracted from the first projection position. When the first moving member moves to the first retraction position, the second moving member moves from a second retraction position, where the second projection portion is retracted from the second projection position, to a second projection position, where the second projection portion projects to the conveyance path. When a sheet pushes the second projection portion, the second moving member is moved from the second projection position to the second retraction position with the first moving member located at the first retraction position.

14 Claims, 15 Drawing Sheets

(51) Int. Cl.
*G03G 15/00* (2006.01)
*H04N 1/00* (2006.01)

(52) U.S. Cl.
CPC ..... *H04N 1/00602* (2013.01); *H04N 1/00615* (2013.01); *H04N 1/00734* (2013.01); *H04N 1/00755* (2013.01); *B65H 2513/51* (2013.01)

(58) Field of Classification Search
CPC .......... B65H 2601/255; B65H 2513/51; G03G 15/6529; H04N 1/00615; H04N 1/00734; H04N 1/00755
See application file for complete search history.

(56) References Cited

U.S. PATENT DOCUMENTS

| | | | | |
|---|---|---|---|---|
| 7,503,886 | B2* | 3/2009 | Sekine | B65H 45/18 |
| | | | | 493/434 |
| 8,433,208 | B2* | 4/2013 | Nanayama | B65H 7/06 |
| | | | | 399/21 |
| 8,626,051 | B2* | 1/2014 | Kasuga | B65H 5/062 |
| | | | | 399/68 |
| 9,382,083 | B2* | 7/2016 | Hyodo | B65H 85/00 |
| 9,580,266 | B1* | 2/2017 | Bell'Albero | B65H 29/58 |

FOREIGN PATENT DOCUMENTS

| | | |
|---|---|---|
| JP | 2016-176986 A | 10/2016 |
| JP | 2021-064893 A | 4/2021 |

* cited by examiner

SHEET CONVEYANCE APPARATUS AND IMAGE FORMING APPARATUS

FIELD

The present disclosure relates to a sheet conveyance apparatus configured to convey sheets and an image forming apparatus including the sheet conveyance apparatus.

DESCRIPTION OF THE RELATED ART

An image forming apparatuses such as a printer, copy machines, and a multi-function peripheral includes a sheet conveyance apparatus configured to convey sheets as recording materials. In the sheet conveyance apparatus, an instance of a sheet becoming stuck in a conveyance path, i.e., a jam, sometimes occurs.

Japanese Patent Application Laid-Open No. 2016-176986 discusses an image forming apparatus that includes a sheet discharge sensor for detecting a recording material jam. In a case where a trailing edge of a recording material is undetected after the sheet discharge sensor detects the recording material although a timing at which the trailing edge of the recording material is supposed to pass through the sheet discharge sensor has passed, the image forming apparatus according to Japanese Patent Application Laid-Open No. 2016-176986 determines that a recording material jam has occurred.

There are conventional image forming apparatuses where recording material jams cannot be detected before a timing at which a trailing edge of a recording material is supposed to pass through a sheet discharge sensor after the sheet discharge sensor detects recording material.

SUMMARY

The present disclosure is directed to providing a sheet conveyance apparatus capable of detecting an occurrence of a jam of a sheet as a recording material at an early time point.

According to an aspect of the present disclosure, a sheet conveyance apparatus includes a conveyance unit configured to convey a sheet through a conveyance path, a first moving member including a first projection portion, wherein the first moving member is movable between a first projection position where the first projection portion projects to the conveyance path and a first retraction position where the first projection portion is retracted from the first projection position, and the first moving member is configured to be moved from the first projection position to the first retraction position when the first projection portion comes into contact with the sheet, a second moving member including a second projection portion and configured to move relative to the first moving member, wherein the second moving member is movable between a second projection position where the second projection portion projects to the conveyance path and a second retraction position where the second projection portion is retracted from the second projection position, and the second moving member is configured to be moved from the second retraction position to the second projection position when the first moving member moves from the first projection position to the first retraction position, and a detection unit configured to detect a movement of the second moving member, wherein, in a case where the second projection portion is pushed by the sheet, the second moving member is moved from the second projection position to the second retraction position in a state where the first moving member is located at the first retraction position.

Further features of the present disclosure will become apparent from the following description of exemplary embodiments with reference to the attached drawings.

DESCRIPTION OF THE EMBODIMENTS

Preferred forms for implementing the present disclosure will be described in detail below as examples with reference to the drawings and exemplary embodiments. Unless otherwise specified, functions, materials, shapes, and relative positions of components described in the exemplary embodiments are not intended to limit the scope of the disclosure.

A first exemplary embodiment of the present disclosure will be described below with reference to the drawings.

An image forming apparatus to and from which four process cartridges are attachable and detachable will be described below as an example of an image forming apparatus according to the present exemplary embodiment. The number of process cartridges attached to the image forming apparatus is not limited to four and is set appropriately as needed.

A laser beam printer will be described below as an example of a form of an image forming apparatus according to the exemplary embodiment described below.

(Entire Structure of Image Forming Apparatus)

Figure 1:
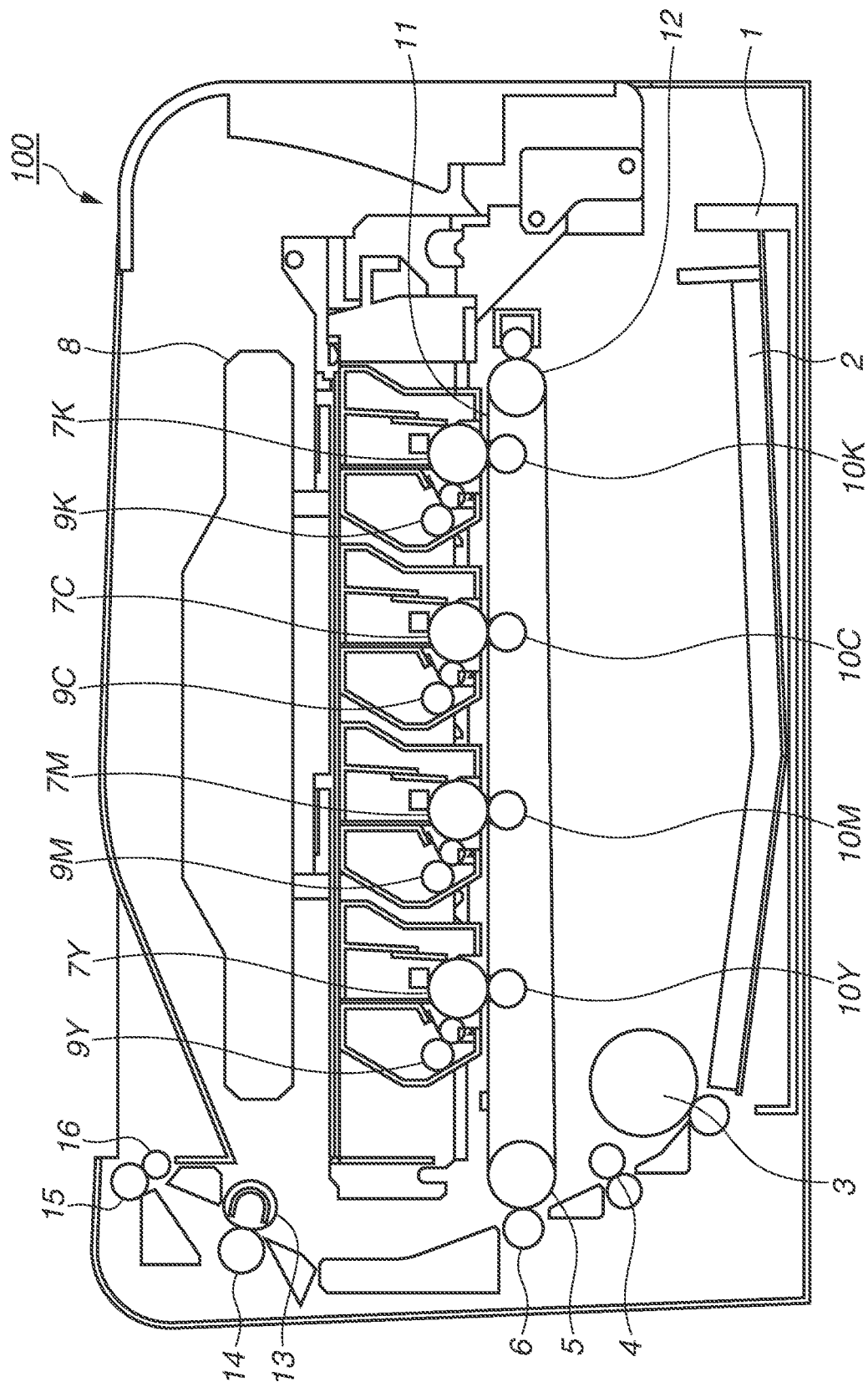
FIG. 1 is a schematic cross-sectional view illustrating an image forming apparatus.

An entire structure of an image forming apparatus 100 will be described below with reference to FIG. 1. FIG. 1 is a schematic cross-sectional view illustrating the image forming apparatus 100.

The image forming apparatus 100 includes a sheet feeding tray 1, a sheet feeding roller 3, a pair of conveyance rollers 4, a secondary transfer roller 6, a pressing roller 14, a heating unit 13, a discharge roller 15, and a driven roller 16. A sheet 2 as a recording material is placed on the sheet feeding tray 1. The driven roller 16 is rotated by the discharge roller 15. The sheet 2 is, for example, paper.

The image forming apparatus 100 includes photosensitive drums (7Y, 7M, 7C, 7K) and development devices (9Y, 9M, 9C, 9K). The photosensitive drums (7Y, 7M, 7C, 7K) are image bearing members that bear electrostatic latent images. The development devices (9Y, 9M, 9C, 9K) each include a development roller brought into contact with the corresponding photosensitive drum (7Y, 7M, 7C, 7K) to develop an electrostatic latent image thereon.

A process cartridge that stores a yellow toner and includes the photosensitive drum 7Y and the development device 9Y forms an yellow image on an intermediate transfer belt 11 described below. A process cartridge that stores a magenta toner and includes the photosensitive drum 7M and the development device 9M forms a magenta image on the intermediate transfer belt 11. A process cartridge that stores a cyan toner and includes the photosensitive drum 7C and the development device 9C forms a cyan image on the intermediate transfer belt 11. A process cartridge that stores a black toner and includes the photosensitive drum 7K and the development device 9K forms a black image on the intermediate transfer belt 11. Each process cartridge is removably attached to the image forming apparatus 100.

The image forming apparatus 100 includes an exposure device (laser scanner) 8 and the intermediate transfer belt 11. The exposure device (laser scanner) 8 is disposed over the photosensitive drums (7Y, 7M, 7C, 7K), and the intermediate transfer belt 11 is disposed beneath the photosensitive drums (7Y, 7M, 7C, 7K). Primary transfer units (10Y, 10M, 10C, 10K), a driving roller 5, and a tension roller 12 are disposed inside the intermediate transfer belt 11. The primary transfer units (10Y, 10M, 10C, 10K) are respectively pressed against the photosensitive drums (7Y, 7M, 7C, 7K). The intermediate transfer belt 11 is stretched around the driving roller 5, the tension roller 12, and the primary transfer units (10Y, 10M, 10C, 10K).

The sheet 2 stored in the sheet feeding tray 1 is fed by the sheet feeding roller 3 rotated in a clockwise direction in FIG. 1 and is conveyed to the pair of conveyance rollers 4. The sheet 2 conveyed by the pair of conveyance rollers 4 is conveyed to a transfer nip formed between the driving roller 5 and the secondary transfer roller 6.

The photosensitive drums (7Y, 7M, 7C, 7K) are each rotated in an counterclockwise direction in FIG. 1. The charged photosensitive drums (7Y, 7M, 7C, 7K) are each illuminated with laser light from the laser scanner 8, and an electrostatic latent image is formed on each of the photosensitive drums (7Y, 7M, 7C, 7K). The electrostatic latent images are developed by the development devices (9Y, 9M, 9C, 9K), and a toner image is formed on each of the photosensitive drums (7Y, 7M, 7C, 7K).

A voltage is applied to the primary transfer units (10Y, 10M, 10C, 10K) to transfer the toner images formed on the photosensitive drums (7Y, 7M, 7C, 7K) to the intermediate transfer belt 11. The driving roller 5 is driven and rotated clockwise in FIG. 1 to move the intermediate transfer belt 11 at substantially the same speed as a speed at which surfaces of the photosensitive drums (7Y, 7M, 7C, 7K) are moved.

In a case where a color image is to be formed, yellow, magenta, cyan, and black toner images are respectively developed on the photosensitive drums (7Y, 7M, 7C, 7K). The toner images formed on the photosensitive drums (7Y, 7M, 7C, 7K) are sequentially transferred onto the intermediate transfer belt 11 by the primary transfer units 10Y, 10M, 10C, and 10K.

The transferred toner images on the intermediate transfer belt 11 are transferred onto the sheet 2 at the transfer nip formed between the driving roller 5 and the secondary transfer roller 6. The process cartridges and the intermediate transfer belt 11 have a function as an image forming unit that forms an image on the sheet 2. The transfer nip is a transfer portion where toner images are transferred from the image forming unit onto the sheet 2.

The sheet 2 with the transferred toner images thereon is conveyed to a fixing nip formed between the heating unit 13 and the pressing roller 14. At the fixing nip, the sheet 2 and the toner images are heated and pressed to fix the toner images to the sheet 2. The sheet 2 with the toner images fixed thereon is discharged by the discharge roller 15 and the driven roller 16.

The part of the image forming apparatus 100 that relates to the conveyance of the sheet 2 can be referred to as a sheet conveyance apparatus. The sheet feeding roller 3, the pair of conveyance rollers 4, the secondary transfer roller 6, the intermediate transfer belt 11, the pressing roller 14, the heating unit 13, the discharge roller 15, and the driven roller 16 have a function as a conveyance unit that conveys the sheet 2.

(Structure of Fixing Device)

Figure 2:
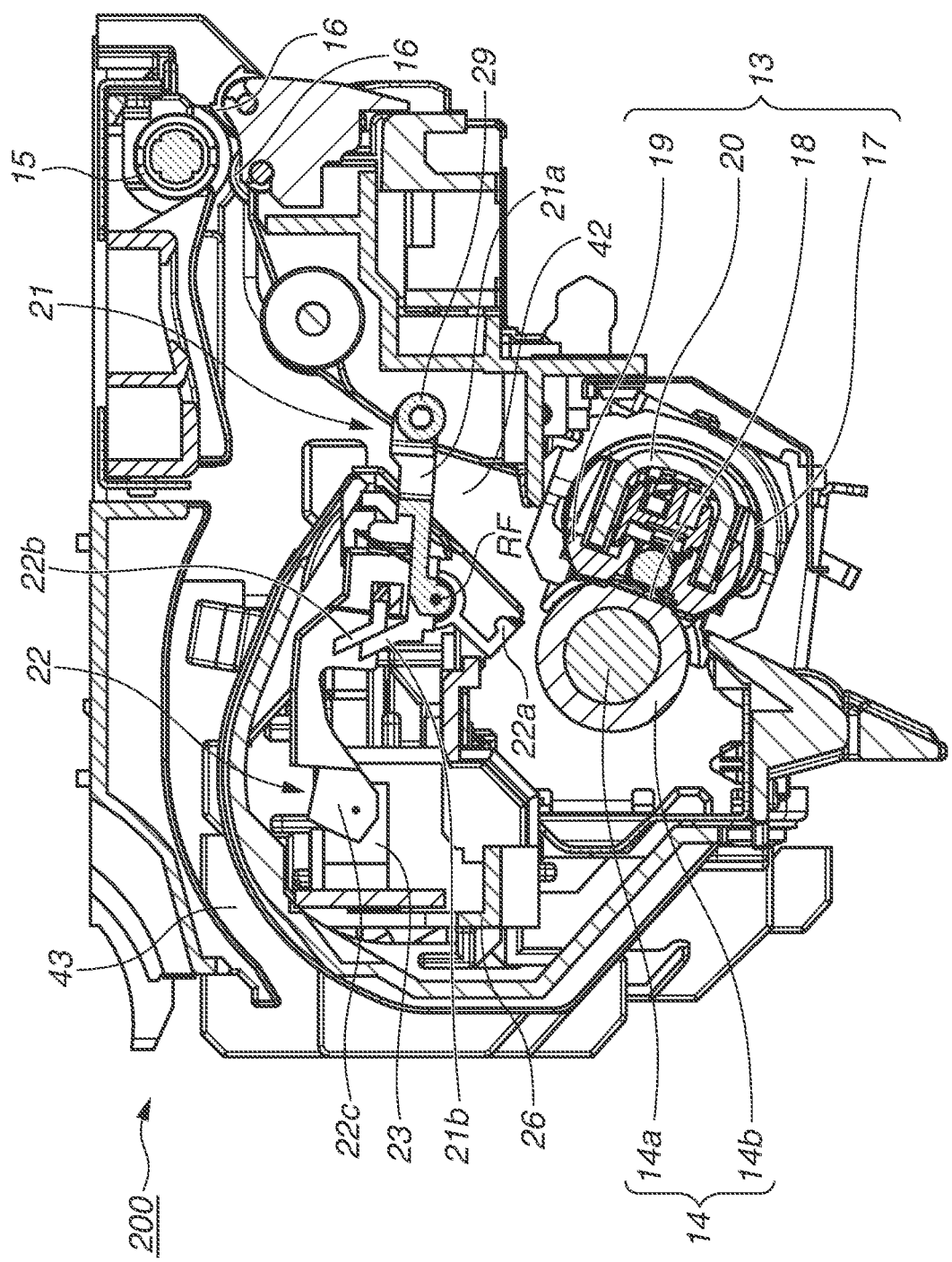
FIG. 2 is a cross-sectional view illustrating a fixing device according to a first exemplary embodiment.

A fixing device 200 according to the present exemplary embodiment will be described below. FIG. 2 is a cross-sectional view illustrating the fixing device 200 according to the present exemplary embodiment.

The image forming apparatus 100 includes the fixing device 200. The fixing device 200 can be referred to as a part of the sheet conveyance apparatus that conveys the sheet 2. The fixing device 200 includes a heating unit (heating portion) 13, the pressing roller 14, the discharge roller 15, and the driven roller 16. The fixing device 200 further includes a first flag 21, a second flag 22, a sheet discharge sensor 23, and a conveyance guide 26. The discharge roller 15 and the driven roller 16 have a function as a discharge unit that conveys the sheet 2 out of the image forming apparatus 100.

The heating unit 13 for heating the sheet 2 includes a fixing film 17, a heater 18, a holder 19, and a stay 20. The fixing film 17 is cylindrical. The heater 18 is in contact with the inner side of the fixing film 17 and heats the fixing film 17. The holder 19 is resistant to heat. The fixing film 17 is, for example, a thin-walled cylindrical plastic film that is highly resistant to heat and is highly heat-conductive. The heater 18 is a heat generator formed by applying a conductor to a metal base material coated with an insulator. The heater 18 receives power supplied from a power source (not illustrated) and generates heat. The heater 18 is supported by the holder 19 in a state where the heater 18 is fitted in a groove portion of the holder 19 and fixed. The fixing film 17 is attached to cover an outer periphery of the heater 18, the holder 19, and the stay 20 and can rotationally move.

As the heating unit 13 receives a force from a pressing spring, the heating unit 13 comes into contact with the pressing roller 14 at a predetermined pressure and forms the fixing nip. The pressing roller 14 includes a core metal 14a and a heat-resistant elastic layer 14b formed in the shape of a roller around an outer periphery of the core metal 14a. The heat-resistant elastic layer 14b of the pressing roller 14 has elasticity, so that the fixing nip having a predetermined width in a conveyance direction of the sheet 2 is formed between the heating unit 13 and the pressing roller 14. The pressing roller 14 is driven and rotated at a predetermined speed by a drive-train (not illustrated). The rotation of the pressing roller 14 causes a friction force between the fixing film 17 and the pressing roller 14, and the fixing film 17 is rotated by the pressing roller 14.

In a state where the pressing roller 14 and the fixing film 17 are rotated and heat is generated by the heater 18, the sheet 2 bearing the unfixed toner image is conveyed to the fixing nip between the fixing film 17 and the pressing roller 14. The sheet 2 having arrived at the fixing nip is conveyed while the pressing roller 14 and the fixing film 17 nip the sheet 2. In this process, the heat from the heater 18 is applied to the sheet 2 through the fixing film 17, and the unfixed toner image is heated and pressed, whereby the heated and pressed toner image is fixed to the sheet 2.

Curvatures of the pressing roller 14 and the fixing film 17 are set so that the sheet 2 after passing through the fixing nip is separated from the pressing roller 14 and the fixing film 17. The sheet 2 is conveyed downstream of the fixing nip by the pressing roller 14 and the fixing film 17.

A conveyance path 42 is arranged downstream of the fixing nip (downstream of the heating unit 13) in the conveyance direction of the sheet 2. The conveyance path 42 guides the sheet 2 toward the discharge unit downstream of the heating unit 13 (downstream of the fixing nip). The sheet 2 is conveyed through the conveyance path 42 by the pressing roller 14. The sheet 2 conveyed through the conveyance path 42 comes into contact with the first flag 21 projecting across the conveyance path 42 and causes the first flag 21 to rotate. Details of operations of the first flag 21 will be described below.

After causing the first flag 21 to rotate, the sheet 2 arrives at a sheet discharge nip formed by the discharge roller 15 and the driven roller 16. According to the present exemplary embodiment, the plurality of driven rollers 16 is in contact with the discharge roller 15. The sheet 2 is discharged to a sheet discharge tray by the discharge roller 15 and the driven roller 16. The sheet discharge tray is formed at a top portion of the image forming apparatus 100.

Further, the fixing device 200 includes a re-conveyance path 43. The sheet 2 after passing through the conveyance path 42 is guided upstream of the conveyance path 42 by the re-conveyance path 43. The sheet 2 after passing through the re-conveyance path 43 is conveyed to the image forming unit again and to the conveyance path 42 through the fixing nip.

In a case where an image is to be formed on both sides of the sheet 2, first, one side (front surface) of the sheet 2 faces the intermediate transfer belt 11, and an image is formed on the front surface of the sheet 2. The sheet 2 with the image formed on the front surface is conveyed through the conveyance path 42 toward the re-conveyance path 43. According to the present exemplary embodiment, the sheet 2 is conveyed through the conveyance path 42, and part of the sheet 2 projects from the image forming apparatus 100 toward the sheet discharge tray. In this state, the discharge roller 15 counter-rotates to convey the sheet 2 to the re-conveyance path 43 with a trailing edge of the sheet 2 on the downstream side.

The sheet 2 is conveyed through the re-conveyance path 43 and arrives at the image forming unit again with a back surface of the sheet 2 facing the intermediate transfer belt 11, and an image is formed on the back surface of the sheet 2.

(Details of Sheet Detection Structure)

A sheet detection structure for detecting the sheet 2 will be described below with reference to FIGS. 2, 3, 4, 5, 6, 7, and 15.

Figure 3:
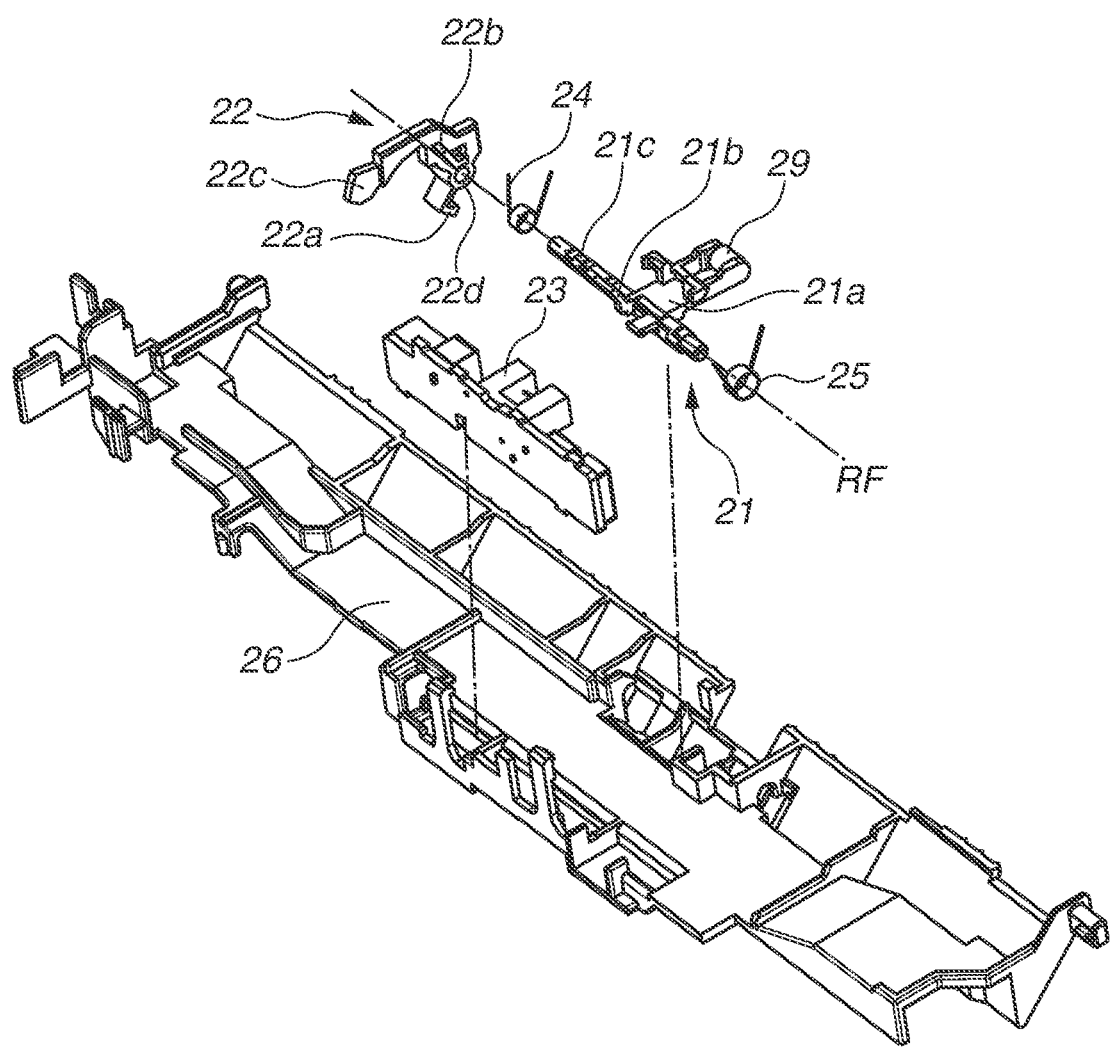
FIG. 3 is an exploded perspective view illustrating a first flag, a second flag, and a sheet discharge sensor according to the first exemplary embodiment.
Figure 4:
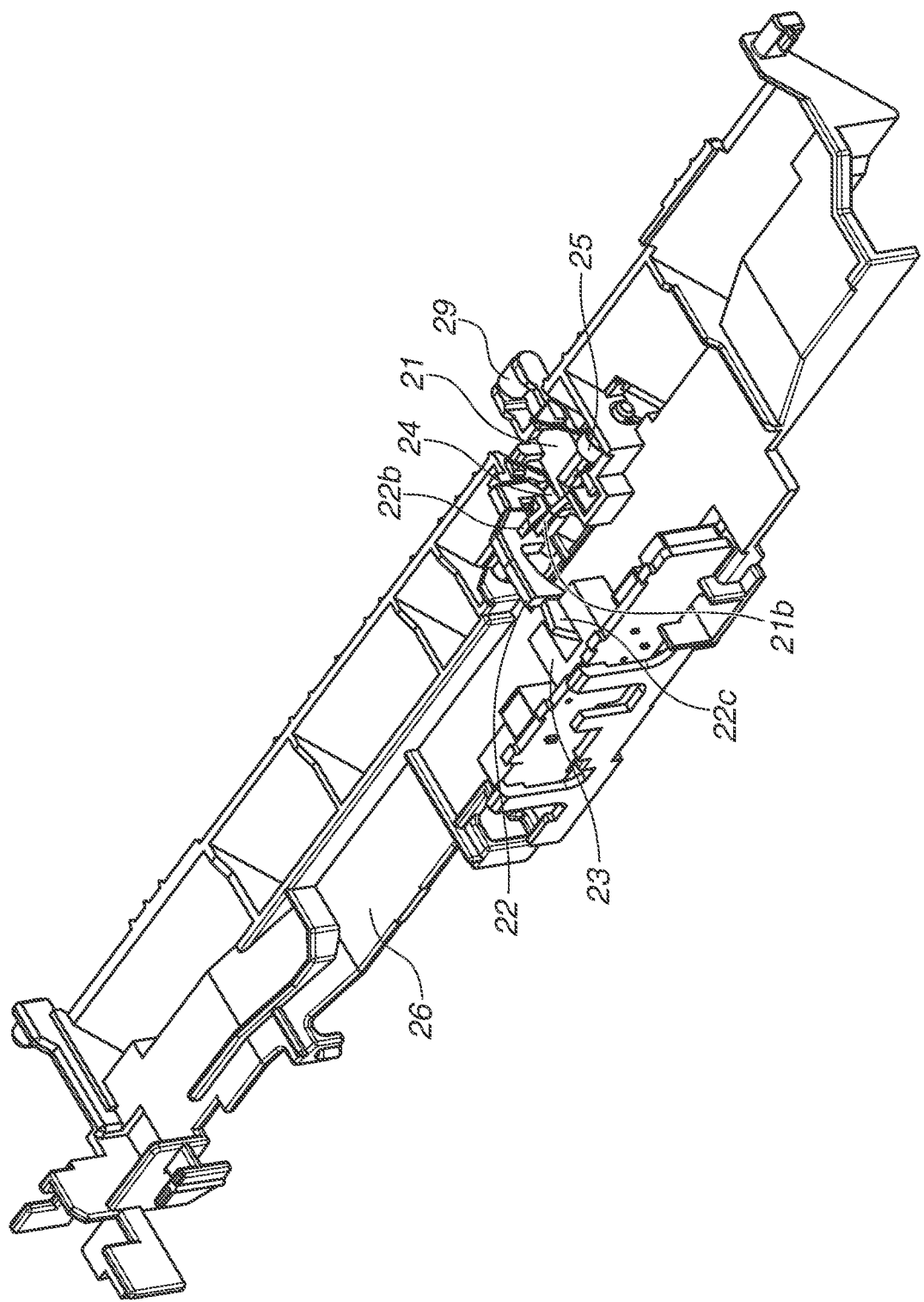
FIG. 4 is a perspective view illustrating a state where the first flag, the second flag, and the sheet discharge sensor according to the first exemplary embodiment are fitted together.

FIG. 3 is an exploded perspective view illustrating the first flag (first moving member) 21, the second flag (second moving member) 22, and the sheet discharge sensor (detection unit) 23. FIG. 4 is a perspective view illustrating a state where the first flag 21, the second flag 22, and the sheet discharge sensor 23 are fitted together.

The fixing device 200 of the image forming apparatus 100 includes the first flag 21, the second flag 22, and the sheet discharge sensor 23. The sheet discharge sensor 23 is a detection unit configured to detect movements of the second flag 22.

The second flag 22 is movable relative to the first flag 21. According to the present exemplary embodiment, the second flag 22 is attached to the first flag 21. The first flag 21 is movable between a first projection position (FIG. 2) described below and a first retraction position (FIG. 5) where the first flag 21 is retracted from the first projection position. The second flag 22 is movable between a second projection position (FIG. 5) described below and a second retraction position (FIG. 2) where the second flag 22 is retracted from the second projection position.

As illustrated in FIGS. 3 and 4, the first flag 21 includes a first projection portion 21a, a rotation stopper portion (supporting portion, regulating portion) 21b, and a shaft portion 21c. The second flag 22 includes a second projection portion 22a, a regulated portion (supported portion) 22b, a detected portion 22c, and a hole 22d. The second flag 22s attached to the first flag 21 by inserting the shaft portion 21c into the hole 22d. The second projection portion 22a is disposed upstream of the first projection portion 21a in the conveyance direction of the sheet 2 in the conveyance path 42.

In other words, one of the first flag 21 and the second flag 22 includes an engaging portion (shaft portion) while the other one of the first flag 21 and the second flag 22 includes an engaged portion (hole portion) to be engaged with the engaging portion. The first flag 21 and the second flag 22 can respectively include the hole portion and the shaft portion. Both of the first flag 21 and the second flag 22 can include the hole portion (engaged portion) to engage with the shaft portion (engaging portion) supported by the conveyance guide 26.

The first flag 21 and the second flag 22 are attached to the conveyance guide (frame member) 26 of the fixing device 200. Specifically, the shaft portion 21c is rotatably supported by the conveyance guide 26, and the second flag 22 is rotatably supported by the shaft portion 21c. Consequently, the first flag 21 and the second flag 22 are supported rotatably (swingably) about a rotation axis (swing axis, rotation center) RF. In other words, the first flag 21 is rotatable about the rotation axis RF, and the second flag 22 is rotatable about the rotation axis RF.

According to the present exemplary embodiment, the sheet discharge sensor 23 is attached to the conveyance guide 26. The positions of the first flag 21, the second flag 22, and the sheet discharge sensor 23 are determined by the conveyance guide 26 as a single frame member. In this way, the accuracy of the positions with respect to one another is improved.

Figure 15:
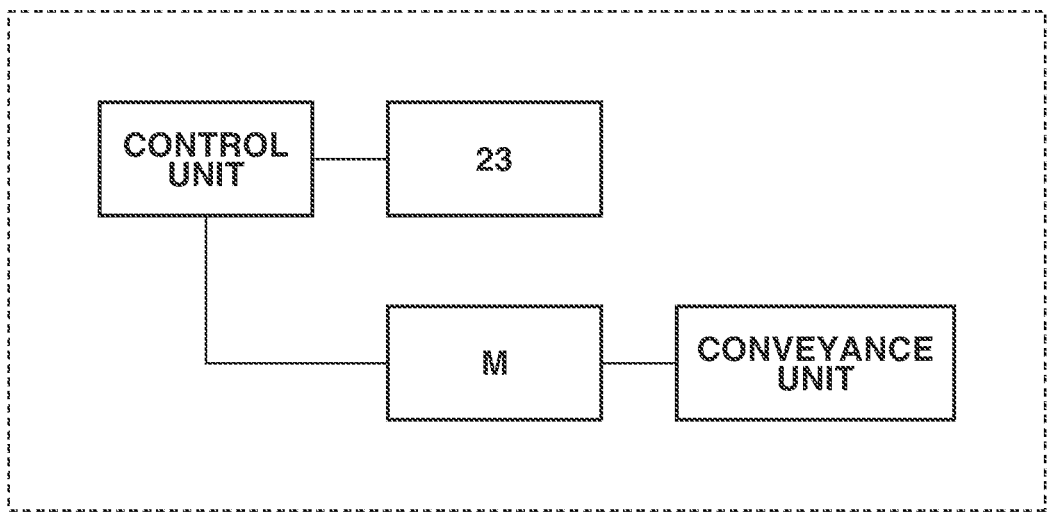
FIG. 15 is a schematic diagram illustrating a control unit.

FIG. 15 is a schematic diagram illustrating a control unit of the sheet conveyance apparatus. The image forming apparatus 100 includes the control unit and a motor M. The control unit is connected to the sheet discharge sensor 23. The motor M is a driving source that drives the conveyance unit. The control unit controls the motor M. The motor M and the control unit can be referred to as part of the sheet conveyance apparatus.

According to the present exemplary embodiment, the sheet discharge sensor 23 is an optical sensor. In a case where the detected portion 22c of the second flag 22 is inserted into a slit of the sheet discharge sensor 23, the sheet discharge sensor 23 is turned into a light-interrupted state. In a case where the detected portion 22c is retracted from the slit of the sheet discharge sensor 23, the sheet discharge sensor 23 is turned into a light-transmitted state. A signal output from the sheet discharge sensor 23 changes when the sheet discharge sensor 23 is turned between the light-transmitted state and the light-interrupted state. Based on the signal change, the control unit detects a movement of the second flag 22. The control unit controls the motor M to drive or stop the conveyance unit based on the signal output from the sheet discharge sensor 23.

A flag urging spring (urging member, first urging member) 24 is disposed between the first flag 21 and the second flag 22. The flag urging spring 24 is a torsion coil spring. The shaft portion 21c is inserted into the flag urging spring 24. One end of the flag urging spring 24 presses the first flag 21, and another end of the flag urging spring 24 presses the second flag 22. In other words, the flag urging spring 24 urges the first flag 21 and the second flag 22. Consequently, the regulated portion 22b of the second flag 22 is pressed against the rotation stopper portion 21b of the first flag 21, and the rotation stopper portion 21b of the first flag 21 and the regulated portion 22b of the second flag 22 are brought into contact with each other. While the rotation stopper portion 21b and the regulated portion 22b are in contact with each other, the first flag 21 is moved from the first projection position to the first retraction position, and the second flag 22 is moved integrally with the first flag 21 from the second retraction position to the second projection position.

A flag holding spring (second urging member, holding urging member) 25 is attached to the first flag 21. The flag holding spring 25 is a torsion coil spring. The shaft portion 21c is inserted into the flag holding spring 25. One end of the flag holding spring 25 presses the conveyance guide 26, and another end presses the first flag 21. The flag holding spring 25 generates an urging force between the first flag 21 and the conveyance guide 26 to thereby hold an orientation of the first flag 21.

The first projection portion 21a of the first flag 21 is in direct contact with the sheet 2. A leading edge roller 29 is rotatably attached to a leading edge of the first projection portion 21a. The leading edge roller 29 reduces a friction force acting on the sheet 2.

The movement of the first flag 21 by the sheet 2 will be described below with reference to FIGS. 2 and 5.

Figure 5:
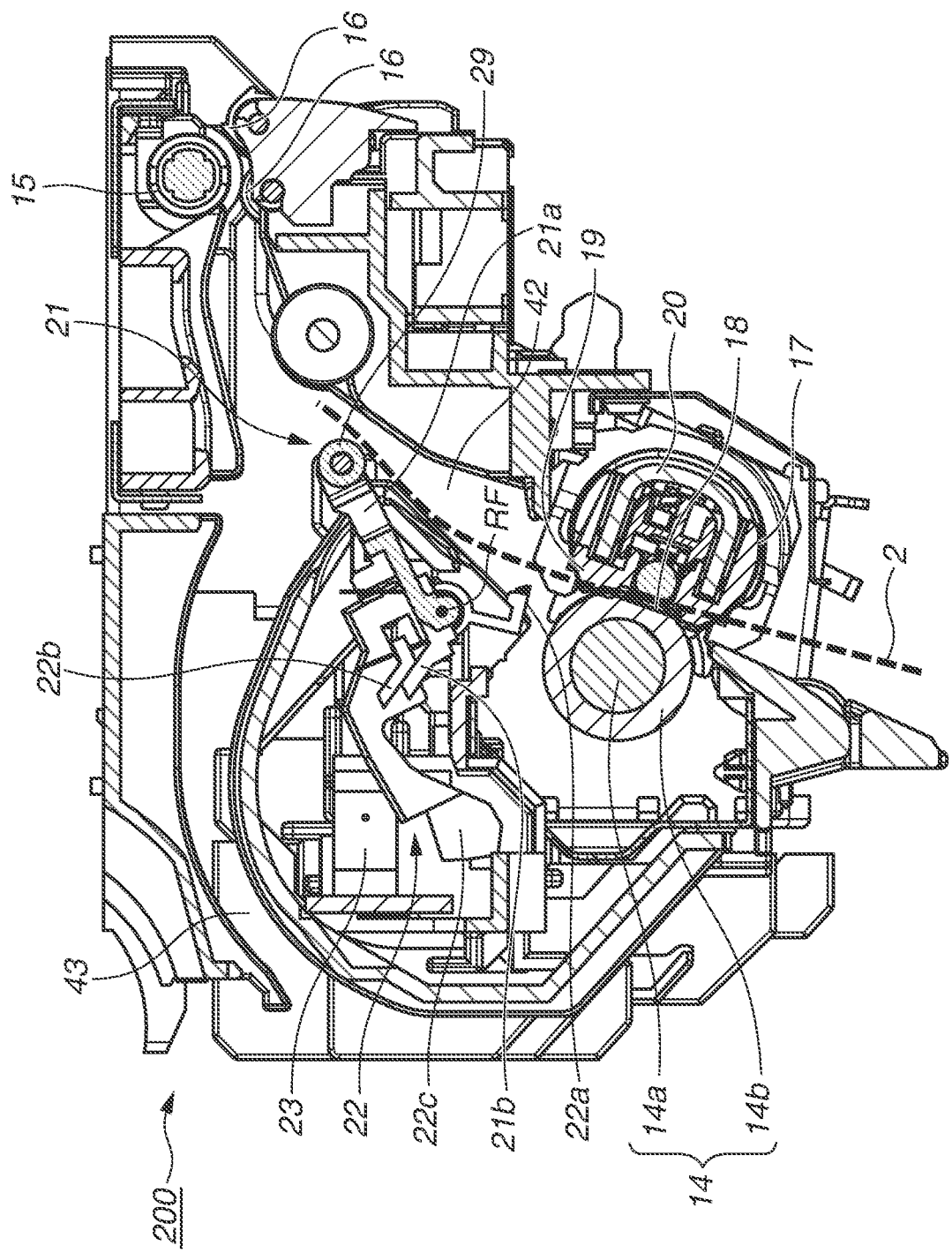
FIG. 5 is a cross-sectional view illustrating the fixing device according to the first exemplary embodiment.

FIG. 5 is a cross-sectional view illustrating the fixing device 200 in a state where the first flag 21 is moved by the sheet 2.

In a state where the first flag 21 is not pushed by the sheet 2 as illustrated in FIG. 2, the first flag 21 is positioned at the first projection position by the flag holding spring 25, and the first projection portion 21a projects to the conveyance path 42. Meanwhile, the regulated portion 22b of the second flag 22 is pressed against the rotation stopper portion 21b of the first flag 21, and the second flag 22 is positioned at the second retraction position. In the state where the second flag 22 is at the second retraction position, the second projection portion 22a is retracted from the conveyance path 42. The detected portion 22c of the second flag 22 is in the slit portion of the sheet discharge sensor 23, and the sheet discharge sensor 23 is in the light-interrupted state.

As illustrated in FIG. 5, when the sheet 2 is conveyed through the fixing nip and comes into contact with the first projection portion 21a of the first flag 21, the first flag 21 is moved from the first projection position to the first retraction position. Specifically, the first projection portion 21a is pushed by the sheet 2 conveyed by the pressing roller 14, and the first flag 21 rotates counterclockwise (first direction) about the rotation axis RF in FIGS. 2 and 5. The first flag 21 is moved from the first projection position to the first retraction position.

As illustrated in FIG. 5, when the first flag 21 rotates and is moved from the first projection position to the first retraction position, the second flag 22 is moved from the second retraction position to the second projection position where the second projection portion 22a projects to the conveyance path 42. Specifically, when the first flag 21 rotates and is moved from the first projection position to the first retraction position, the second flag 22 rotates counterclockwise in FIGS. 2 and 5 integrally with the first flag 21. Consequently, the second flag 22 is positioned at the second projection position as illustrated in FIG. 5.

Further, when the first flag 21 is moved from the first projection position to the first retraction position as illustrated in FIG. 5, the second flag 22 is moved from the second retraction position to the second projection position, and the detected portion 22c is retracted from the slit portion of the sheet discharge sensor 23. Consequently, the sheet discharge sensor 23 is turned from the light-interrupted state to the light-transmitted state, and the output of the sheet discharge sensor 23 (signal output from the sheet discharge sensor 23) changes. Based on the output change, the control unit detects a leading edge position of the sheet 2, and in a case where the leading edge position of the sheet 2 is not within a predetermined range, the control unit stops the conveyance unit.

In a case where the sheet 2 is stuck (jam, paper being stuck, sheet being stuck) and the conveyance of the sheet 2 is continued, it may become difficult to clear the jam. Stopping the conveyance unit promptly reduces difficulties in clearing the jam by a user.

When the first flag 21 is pushed by the sheet 2, the second projection portion 22a of the second flag 22 projects to the conveyance path 42. At this time, it is desirable that the amount of the projection of the second projection portion 22a is small enough to not come into contact with the sheet 2 that is normally conveyed. In other words, in a case where the second flag 22 is at the second projection position, the second projection portion 22a is disposed apart from the sheet 2 normally conveyed in the conveyance path 42, and a space is formed between the sheet 2 and the second projection portion 22a.

In this way, the sheet 2 and the second projection portion 22a are prevented from rubbing each other in a case where the sheet 2 is normally conveyed. Further, the second projection portion 22a is prevented from coming into contact with the sheet 2 and removing a printed image from the sheet 2 in a case where an image is printed on both sides of the sheet 2.

After the sheet 2 is normally conveyed and the trailing edge of the sheet 2 passes through the first projection portion 21a, the first flag 21 urged by the flag holding spring 25 rotates clockwise about the rotation axis RF and is moved from the first retraction position to the first projection position. When the first flag 21 is moved from the first retraction position to the first projection position, the second flag 22 is moved from the second projection position to the second retraction position. Consequently, the detected portion 22c shields the sheet discharge sensor 23 to turn the sheet discharge sensor 23 from the light-transmitted state to the light-interrupted state, and the output of the sheet discharge sensor 23 (signal output from the sheet discharge sensor 23) changes. Based on the output change, the control unit detects the position of the trailing edge of the sheet 2, and in a case where the detected position of the trailing edge of the sheet 2 is not within a predetermined range, the control unit stops the conveyance unit.

Figure 6:
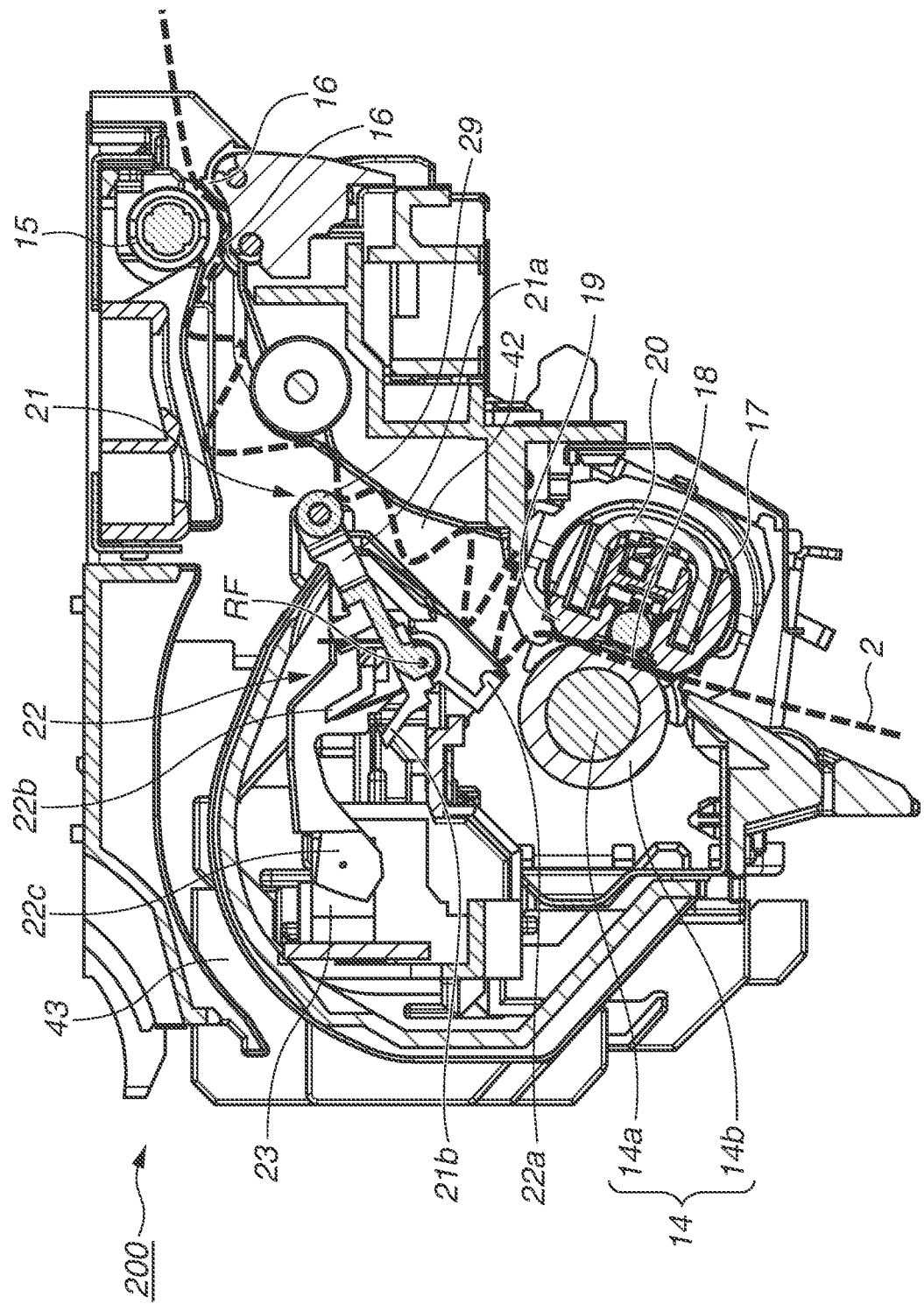
FIG. 6 is a cross-sectional view illustrating the fixing device according to the first exemplary embodiment.

A behavior in a case where a jam occurs after the leading edge of the sheet 2 passes through the first flag 21 will be described below with reference to FIG. 6. FIG. 6 is a cross-sectional view illustrating the fixing device 200 in a state where the sheet 2 becomes stuck in the conveyance path 42.

In a case where a jam occurs downstream of the first flag 21, the control unit of the image forming apparatus 100 cannot detect the abnormality instantly. Thus, the conveyance unit (in this case, the pressing roller 14 and the fixing film 17) continues conveying the sheet 2. Consequently, the sheet 2 is accordion-folded as illustrated in FIG. 6.

According to the present exemplary embodiment, the second projection portion 22a comes into contact with the sheet 2 to thereby move the second flag 22 from the second projection position to the second retraction position in a state where the first flag 21 is at the first retraction position. When viewed along the rotation axis RF, a rotational direction of the first flag 21 from the first projection position to the first retraction position and a rotational direction of the second flag 22 from the second projection position to the second retraction position are opposite to each other.

In a case where a jam occurs in the conveyance path 42, the accordion-folded sheet 2 comes into contact with the second projection portion 22a of the second flag 22 at the second projection position and moves the second flag 22 against the urging force of the flag urging spring 24. In a case where the sheet 2 comes into contact with the second projection portion 22a in a state where the first flag 21 is at the first retraction position and the second flag 22 is at the second projection position, the second flag 22 is moved relative to the first flag 21 and is moved from the second projection position to the second retraction position. At this time, the second flag 22 rotates in the opposite direction to the direction in which the second flag 22 rotates in a case where the sheet 2 is conveyed normally, and the regulated portion 22b is separated from the rotation stopper portion 21b.

Since the first flag 21 is in contact with the sheet 2, the movement of the first flag 21 from the first retraction position to the first projection position is restricted. However, the second flag 22 is movable relative to the first flag 21 from the second projection position to the second retraction position. For this reason, the second flag 22 can move from the second projection position to the second retraction position in the state where the first flag 21 is at the first retraction position.

Specifically, in the state where the first flag 21 is at the first retraction position and the second flag 22 is at the second projection position, the movement of the second flag 22 in the direction (counterclockwise in FIG. 5) from the second retraction position to the second projection position is restricted by the rotation stopper portion 21b of the first flag 21. On the other hand, in the state where the first flag 21 is at the first retraction position and the second flag 22 is at the second projection position, the movement of the second flag 22 in the direction (clockwise in FIG. 5) from the second projection position to the second retraction position is allowed. For this reason, even in a state where the first flag 21 is positioned at the first retraction position due to the sheet 2, the second flag 22 can move from the second projection position to the second retraction position in a case where the second projection portion 22a is pushed by the sheet 2. Consequently, the second flag 22 is positioned so that the sheet discharge sensor 23 can detect the movement of the second flag 22 as illustrated in FIG. 6.

The urging force of the flag urging spring 24 is great enough for the second flag 22 to move integrally with the first flag 21 from the second retraction position to the second projection position in a case where the first flag 21 is moved from the first projection position to the first retraction position. Desirably, the urging force of the flag urging spring 24 is great enough for the sheet 2 having the lowest stiffness among the sheets 2 for use by the image forming apparatus 100 to move the second flag 22 relative to the first flag 21 against the urging force of the flag urging spring 24.

As described above, in a case where a jam occurs in the conveyance path 42, the second flag 22 rotates about the rotation axis RF in a state where the first flag 21 is at the first projection position, and the second flag 22 rotates from the second projection position to the second retraction position. Consequently, the detected portion 22c shields the sheet discharge sensor 23 so that the sheet discharge sensor 23 is turned from the light-transmitted state to the light-interrupted state, and the output of the sheet discharge sensor 23 (signal output from the sheet discharge sensor 23) changes. Specifically, the timing at which the sheet discharge sensor 23 is turned from the light-transmitted state to the light-interrupted state is earlier than the timing at which the trailing edge of the sheet 2 passes through the first projection portion 21a in a case where the sheet 2 is normally conveyed.

The control unit detects an occurrence of an abnormality in the conveyance of the sheet 2 based on the response of the sheet discharge sensor 23 at a timing different from a predetermined timing and the output change.

In a case where an occurrence of an abnormality in the conveyance of the sheet 2 is detected, the control unit stops the motor M and stops the conveyance unit.

Figure 7:
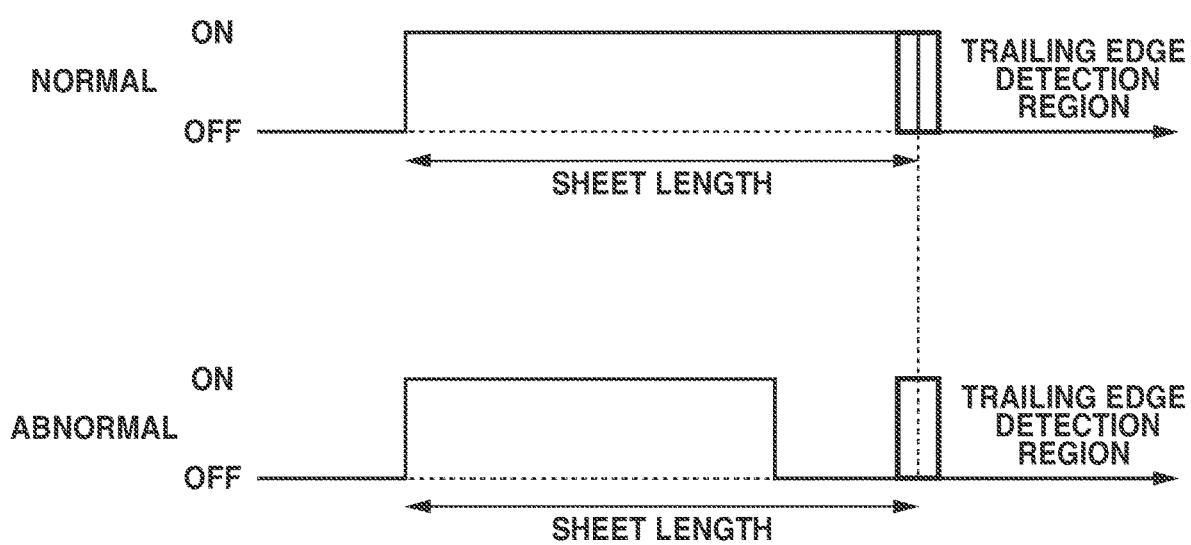
FIG. 7 is a diagram illustrating detection timings of a sheet discharge sensor according to the first exemplary embodiment.

The detection of an abnormality in the conveyance of the sheet 2 will be described below with reference to FIG. 7. FIG. 7 is a diagram illustrating detection timings of the sheet discharge sensor 23. A vertical axis in FIG. 7 represents the output of the sheet discharge sensor 23. The output is "OFF" in a case where the sheet discharge sensor 23 is in the light-interrupted state, whereas the output is "ON" in a case where the sheet discharge sensor 23 is in the light-transmitted state. A horizontal axis in FIG. 7 represents time.

First, in a case where the sheet 2 is not in the conveyance path 42, the signal from the sheet discharge sensor 23 is "OFF". In a case where the sheet 2 is normally brought into contact with the first flag 21, the signal from the sheet discharge sensor 23 becomes "ON".

In a case where the sheet 2 is normally conveyed, the state where the signal from the sheet discharge sensor 23 is "ON" continues while the sheet 2 having a predetermined sheet length passes. After the trailing edge of the sheet 2 passes through the first flag 21, the signal from the sheet discharge sensor 23 changes back to "OFF". The control unit determines whether the timing of the change of the output (signal) of the sheet discharge sensor 23 from "ON" to "OFF" is within a predetermined trailing edge detection region. In a case where the timing of the change of the signal from "ON" to "OFF" is within the trailing edge detection region, the control unit determines that the sheet 2 is normally conveyed. The conveyance of the sheet 2 is continued. On the other hand, in a case where the timing of the change of the signal from "ON" to "OFF" is outside the trailing edge detection region, the control unit determines that the sheet 2 is abnormally conveyed, and the control unit stops the motor M and the conveyance unit to stop the conveyance of the sheet 2.

The trailing edge detection region is determined based on a timing when the trailing edge of the sheet 2 is separated from the first projection portion 21a of the first flag 21, a timing when the first flag 21 is moved to the first projection position, and a timing when the second flag 22 is moved to the second retraction position, in a case where the sheet 2 is normally conveyed. The trailing edge detection region is determined considering variations in sheet length of the sheet 2 and variations in conveyance of the sheet 2. The control unit acquires the sheet length of the sheet 2 based on information input by the user and based on output of a sensor that detects a size of the sheet 2, and the control unit sets the trailing edge detection region based on the sheet length of the sheet 2. The control unit calculates the trailing edge detection region based on the sheet length of the sheet 2. The control unit can set the trailing edge detection region by referring to trailing edge detection region information stored in a storage device of the image forming apparatus 100. The control unit stops the conveyance of the sheet 2 also in a case where the timing of the change of the signal from "ON" to "OFF" is after the trailing edge detection region.

A case where the sheet 2 is not normally conveyed will be described below. Specifically, a case where the sheet 2 becomes stuck downstream of the first flag 21 after the sheet 2 comes into contact with the first flag 21 and the signal from the sheet discharge sensor 23 is changed to "ON" will be described below.

As described above, in a case where the sheet 2 becomes stuck downstream of the first flag 21, the sheet 2 is accordion-folded. The second projection portion 22a of the second flag 22 is pushed by the folded sheet 2, and the second flag 22 is moved from the second projection position to the second retraction position in a state where the first flag 21 is at the first retraction position (refer to FIG. 6).

Consequently, the detected portion 22c shields the sheet discharge sensor 23, and the signal from the sheet discharge sensor 23 changes from "ON" to "OFF". In a case where the second flag 22 is moved to the second retraction position by the sheet 2 having caused a jam as described above, the signal from the sheet discharge sensor 23 is changed to "OFF" at an earlier timing than the trailing edge detection region. In a case where the signal from the sheet discharge sensor 23 is changed to "OFF" at an earlier timing than the trailing edge detection region, the control unit determines that the sheet 2 becomes stuck, and the control unit stops the motor M and stops the conveyance unit.

The foregoing operations are summarized as follows. In a case where the sheet discharge sensor 23 detects a movement of the second flag 22 before a predetermined time passes after the sheet 2 comes into contact with the first flag 21 and the sheet discharge sensor 23 detects a movement of the second flag 22, the control unit stops the conveyance of the sheet 2. The predetermined time refers to a time that is needed for the trailing edge of the sheet 2 to go away from the first flag 21 after the leading edge of the sheet 2 pushes the first flag 21 in a case where the sheet 2 is conveyed normally conveyed in the conveyance path 42. According to the present exemplary embodiment, an end of the predetermined time substantially corresponds to one of ends of the trailing edge detection region that is temporally earlier than the other.

As described above, the first flag 21 and the second flag 22 are formed as separate components so that in a case where the sheet 2 is accordion-folded, the abnormality in the conveyance of the sheet 2 is detected before the time needed for the trailing edge of the sheet 2 to pass through the position of the first flag 21. This makes it possible to stop the image forming apparatus 100 promptly. Thus, continuation of the jam is prevented, and difficulties in clearing the jam by the user are reduced.

A second exemplary embodiment of the present disclosure will be described below. Each portion similar to the corresponding portion according to the first exemplary embodiment is given the same reference numeral as in the first exemplary embodiment, and redundant descriptions thereof are omitted. The sheet conveyance apparatus according to the second exemplary embodiment includes a second flag 32 different in shape from the second flag 22 according to the first exemplary embodiment.

(Details of Structure for Sheet Discharge Sensor Detection)

A structure for detecting the sheet 2 will be described below with reference to FIGS. 8 to 14.

Figure 8:
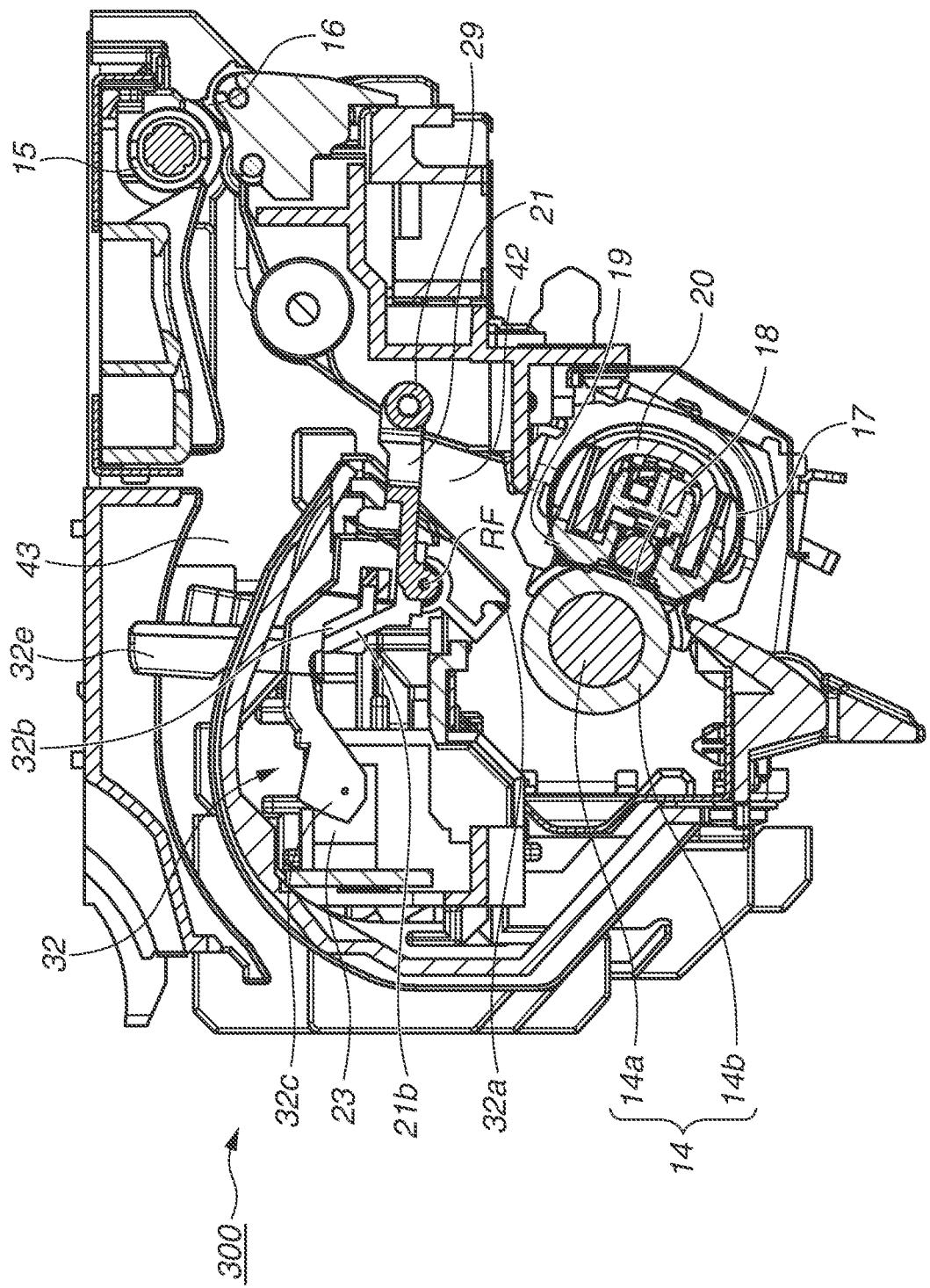
FIG. 8 is a cross-sectional view illustrating a fixing device according to a second exemplary embodiment.
Figure 9:
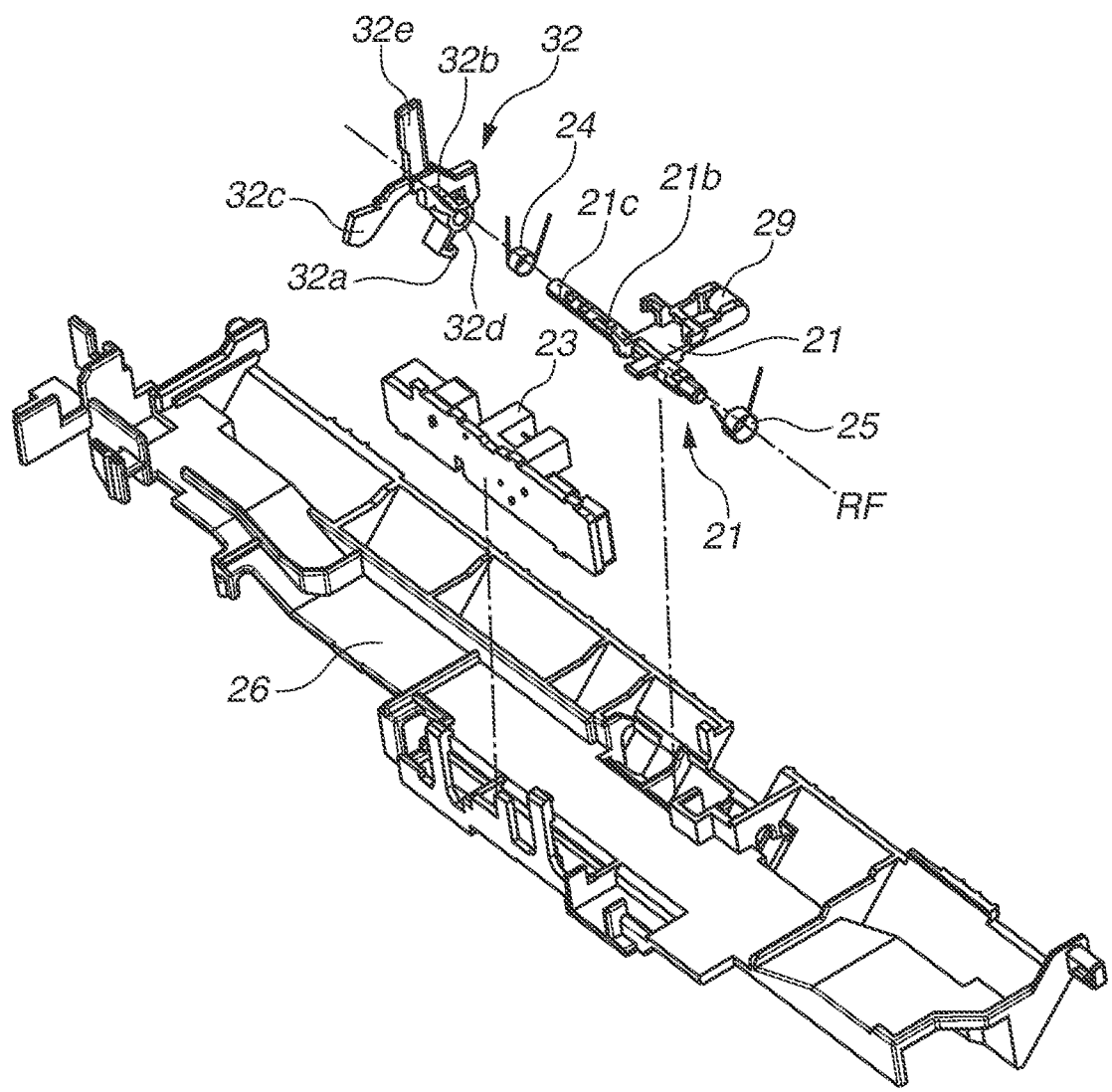
FIG. 9 is an exploded perspective view illustrating a first flag, a second flag, and a sheet discharge sensor according to the second exemplary embodiment.
Figure 10:
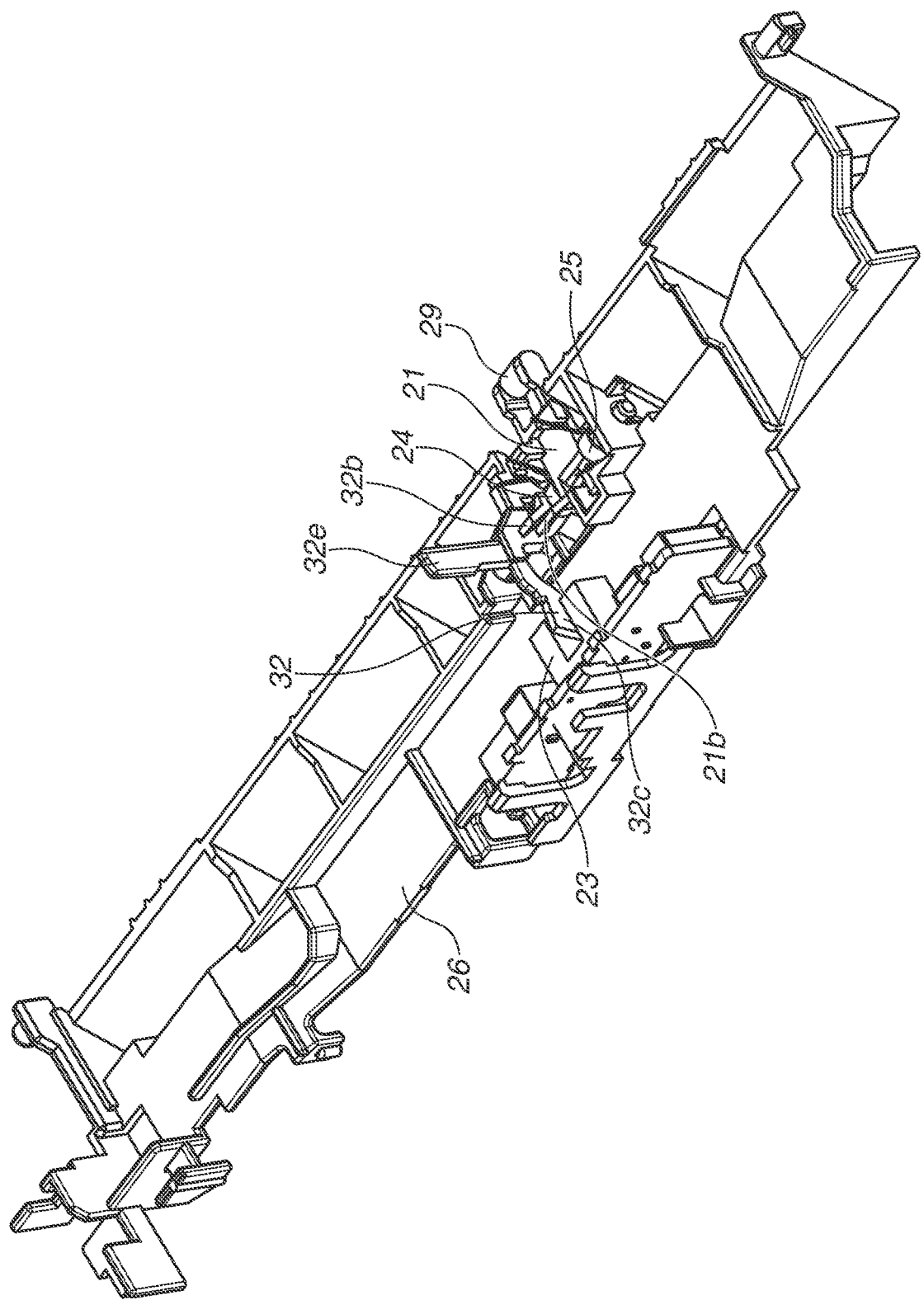
FIG. 10 is a perspective view illustrating a state where the first flag, the second flag, and the sheet discharge sensor according to the second exemplary embodiment are fitted together.

FIG. 8 is a cross-sectional view illustrating a fixing device 300 according to the present exemplary embodiment. FIG. 9 is an exploded perspective view illustrating the first flag 21, the second flag (second moving member) 32, and the sheet discharge sensor 23. FIG. 10 is a perspective view illustrating a state where the first flag 21, the second flag 32, and the sheet discharge sensor 23 are fitted together.

The second flag 32 according to the present exemplary embodiment includes a third projection portion 32e in addition to the second flag 22 according to the first exemplary embodiment. Specifically, the second flag 32 includes a second projection portion 32a, a regulated portion 32b, a detected portion 32c, a hole 32d, and a third projection portion 32e. The second projection portion 32a, the regulated portion 32b, the detected portion 32c, and the hole 32d of the second flag 32 have similar functions and structures to those of the second projection portion 22a, the regulated portion 22b, the detected portion 22c, and the hole 22d of the second flag 22 according to the first exemplary embodiment.

The second flag 32 is attached to the first flag 21 similarly to the second flag 22 according to the first exemplary embodiment.

The second flag 32 includes the third projection portion 32e. The third projection portion 32e projects to the re-conveyance path 43 and comes into contact with the sheet 2 conveyed through the re-conveyance path 43. As illustrated in FIG. 8, in a state where the first flag 21 and the second flag 32 are not in contact with the sheet 2, the first flag 21 is at the first projection position, and the second flag 32 is at the second retraction position. In this state, the third projection portion 32e is at a third projection position projecting to the re-conveyance path 43.

Figure 11:
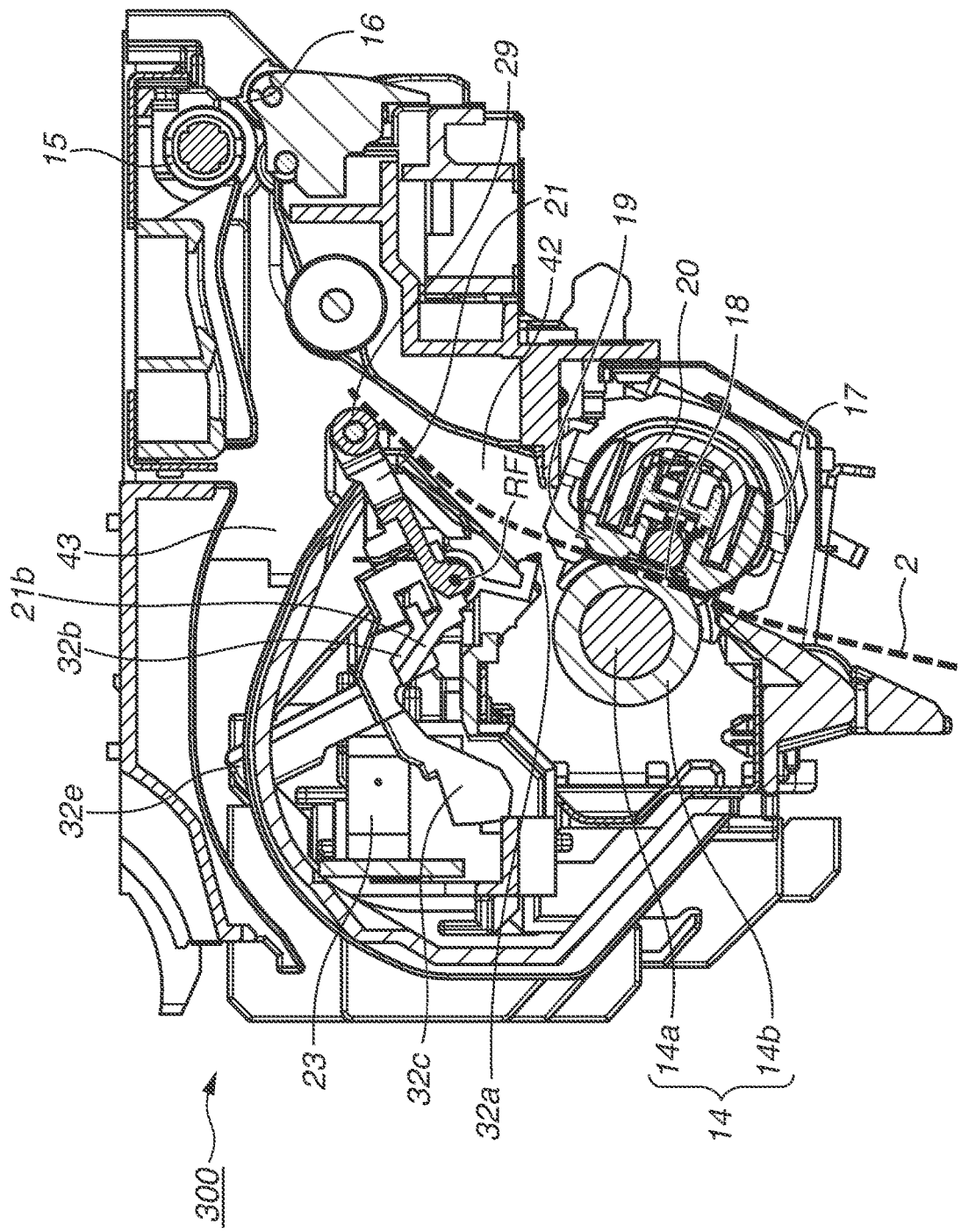
FIG. 11 is a cross-sectional view illustrating the fixing device according to the second exemplary embodiment.

Movements of the first flag 21 and the second flag 32 by the sheet 2 will be described below with reference to FIG. 11. FIG. 11 is a cross-sectional view illustrating the fixing device 300 in a state where the first flag 21 is moved by the sheet 2.

As in the first exemplary embodiment, the sheet 2 comes into contact with the first projection portion 21a of the first flag 21, moves the first flag 21 from the first projection position to the first retraction position, and moves the second flag 32 from the second retraction position to the second projection position. Consequently, the detected portion 32c that is shielding the sheet discharge sensor 23 is moved. In this way, the sheet discharge sensor 23 is turned into the light-transmitted state, and the output of the sheet discharge sensor 23 changes to "ON". Meanwhile, the third projection portion 32e is retracted from the third projection position.

Figure 12:
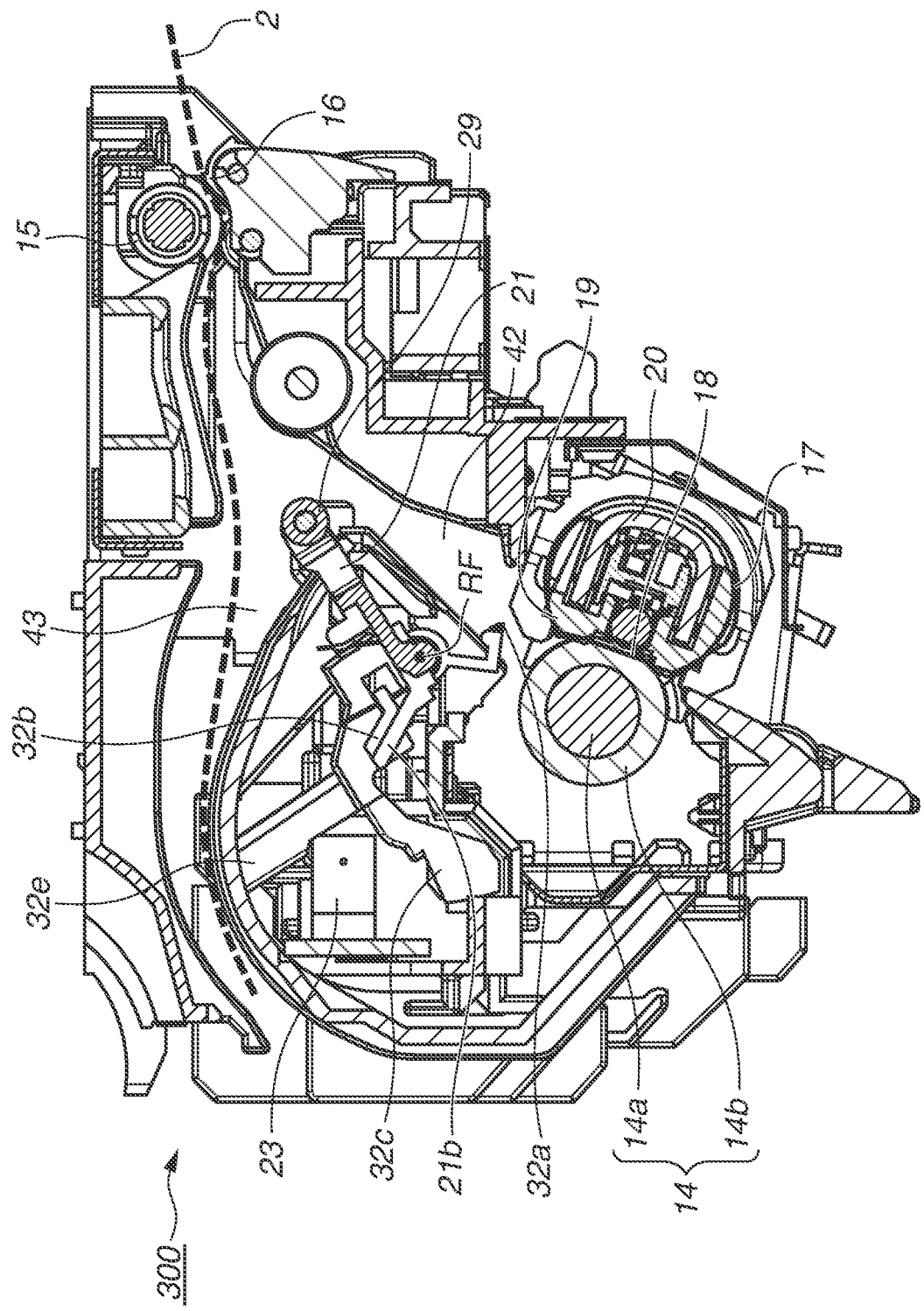
FIG. 12 is a cross-sectional view illustrating the fixing device according to the second exemplary embodiment.

Behaviors of the first flag 21 and the second flag 32 in two-sided printing of printing an image on both sides of the sheet 2 will be described below with reference to FIG. 12. FIG. 12 is a cross-sectional view illustrating the fixing device 300 in a state where the second flag 32 is moved by the sheet 2 passing through the re-conveyance path 43.

As in the first exemplary embodiment, in a case where the sheet 2 is normally conveyed in the conveyance path 42, the trailing edge of the sheet 2 is moved downstream of the first flag 21 and goes away from the first flag 21. Consequently, the first flag 21 is moved to the first projection position by the urging force of the flag holding spring 25 as illustrated in FIG. 8. When the first flag 21 is moved to the first projection position, the second flag 32 is moved from the second projection position to the second retraction position. The third projection portion 32e is moved to the third projection position.

When the second flag 32 is moved to the second retraction position, the detected portion 32c shields the sheet discharge sensor 23. In this way, the sheet discharge sensor 23 is turned into the light-interrupted state, and the output of the sheet discharge sensor 23 changes to "OFF".

The re-conveyance path 43 is disposed above the conveyance path 42. After the trailing edge of the sheet 2 goes away from the first flag 21, the trailing edge of the sheet 2 is lifted toward the re-conveyance path 43 from the conveyance path 42 due to the stiffness of the sheet 2.

From the point at which the output of the sheet discharge sensor 23 changes to "OFF", the control unit reverses the discharge roller 15. The reversed discharge roller 15 conveys the sheet 2 to the re-conveyance path 43 and brings the sheet into contact with the third projection portion 32e. The sheet 2 pushes the third projection portion 32e, and the second flag 32 is moved from the second retraction position to the second projection position. At this time, the regulated portion 32b of the second flag 32 pushes the rotation stopper portion 21b, and the first flag 21 is moved integrally with the second flag 32. When the second flag 32 is moved, the detected portion 32c is retracted from the sheet discharge sensor 23. In this way, the sheet discharge sensor 23 is turned into the light-transmitted state, and the output of the sheet discharge sensor 23 changes to "ON".

The control unit determines whether the sheet 2 normally is conveyed to the re-conveyance path 43 based on the timing at which the output of the sheet discharge sensor 23 changes to "ON".

Figure 13:
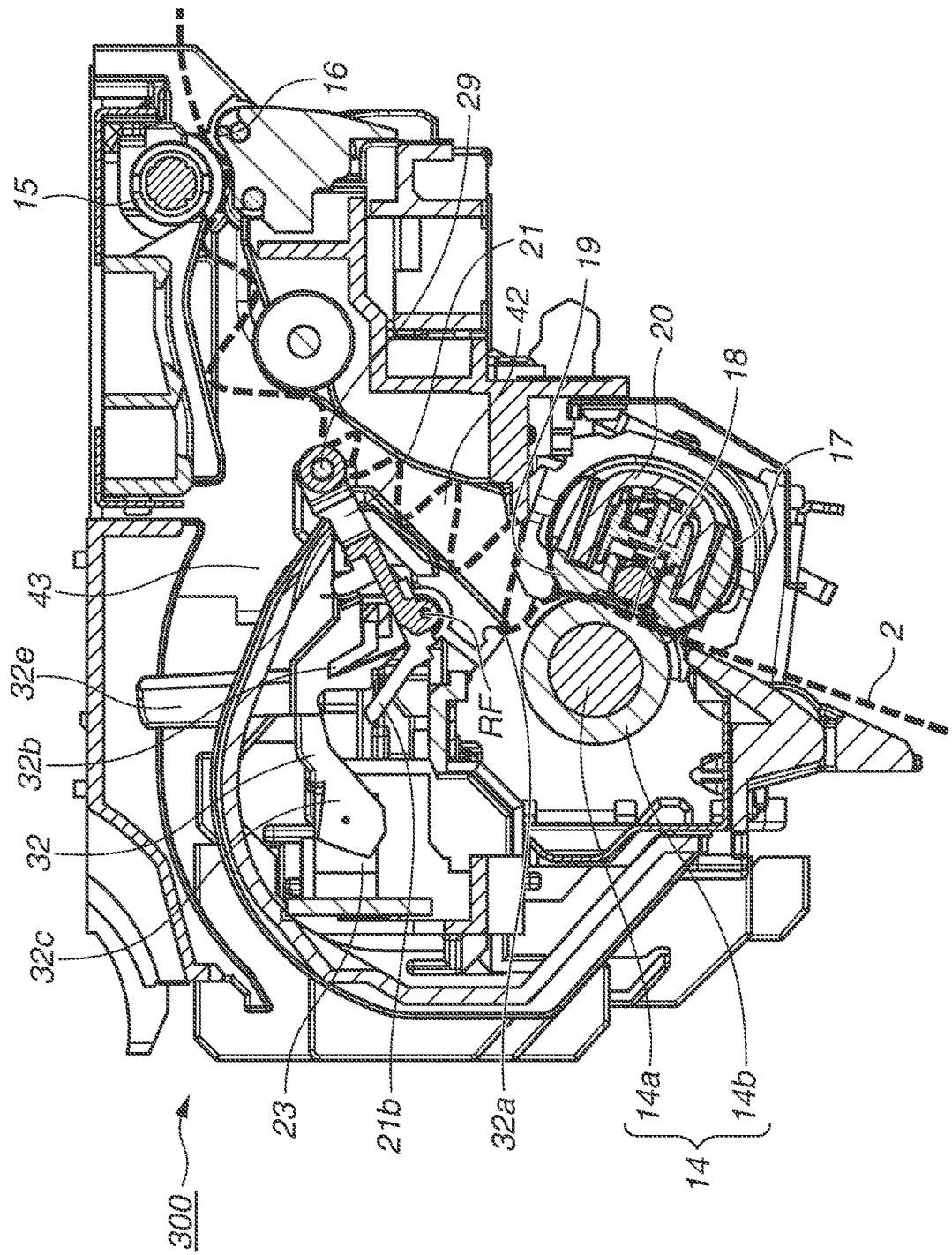
FIG. 13 is a cross-sectional view illustrating the fixing device according to the second exemplary embodiment.

A behavior in a case where a jam occurs after the leading edge of the sheet 2 passes through the first flag 21 will be described below with reference to FIG. 13. FIG. 13 is a cross-sectional view illustrating the fixing device 200 in a state where the sheet 2 becomes stuck in the conveyance path 42.

According to the present exemplary embodiment, as in the first exemplary embodiment, the folded sheet 2 pushes the second projection portion 32a of the second flag 32. Since the first flag 21 is in contact with the sheet 2, a movement from the first retraction position to the first projection position is restricted. However, since the second flag 32 is movable relative to the first flag 21, the second flag 32 can be moved from the second projection position to the second retraction position in a state where the first flag 21 is at the first retraction position. Consequently, the detected portion 32c of the second flag 32 shields the sheet discharge sensor 23. In this way, the sheet discharge sensor 23 is turned into the light-interrupted state, and the output of the sheet discharge sensor 23 changes to "OFF".

Figure 14:
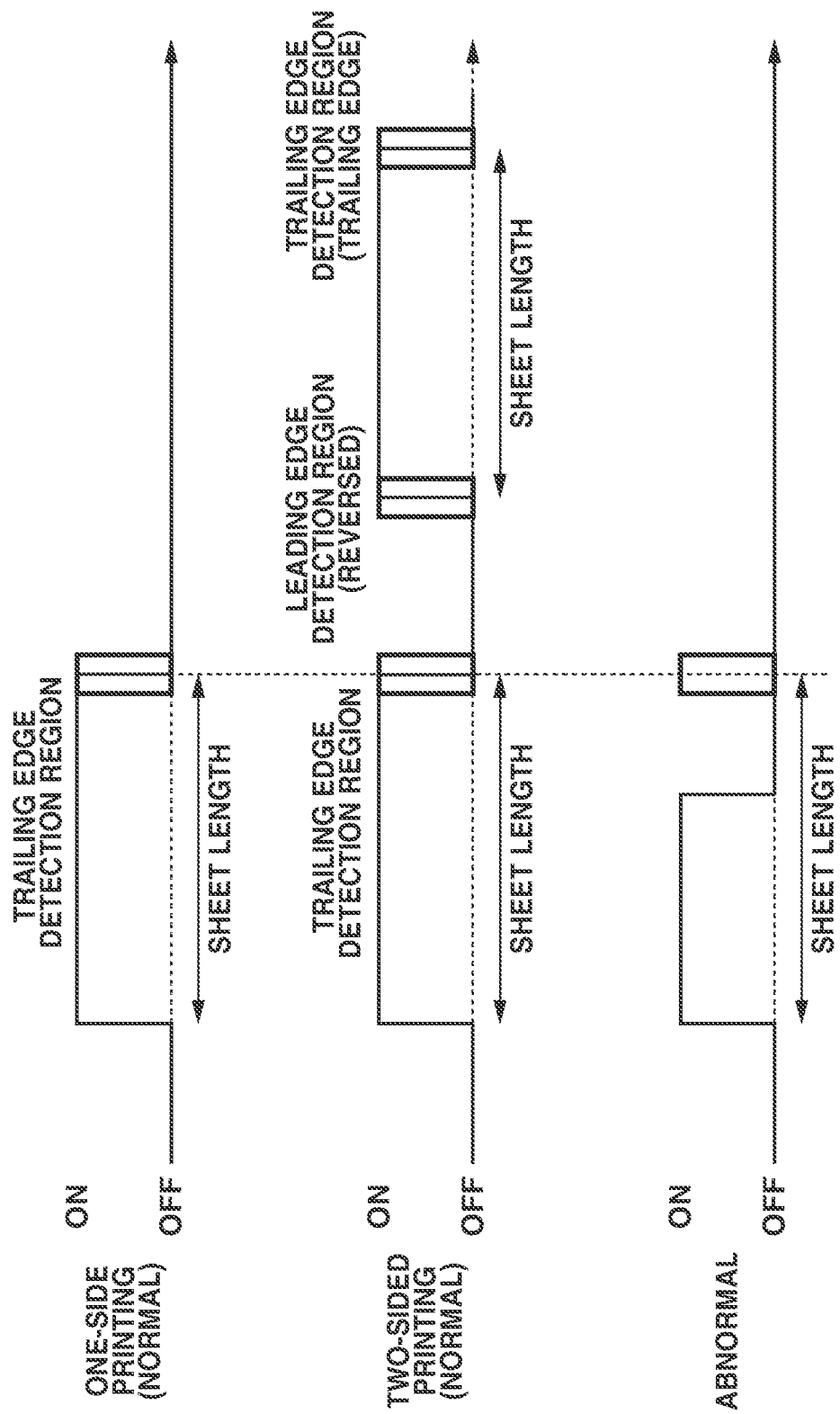
FIG. 14 is a diagram illustrating detection timings of a sheet discharge sensor according to the second exemplary embodiment.

The detection of an abnormality in conveyance of the sheet 2 will be described below with reference to FIG. 14. FIG. 14 is a diagram illustrating detection timings of the sheet discharge sensor 23. A vertical axis in FIG. 14 represents the output of the sheet discharge sensor 23. The output is "OFF" in a case where the sheet discharge sensor 23 is in the light-interrupted state, whereas the output is "ON" in a case where the sheet discharge sensor 23 is in the light-transmitted state. A horizontal axis in FIG. 14 represents time.

As in the first exemplary embodiment, in a case where the sheet 2 is not in the conveyance path 42, the signal from the sheet discharge sensor 23 is "OFF". In a case where the sheet 2 is normally brought into contact with the first flag 21, the signal from the sheet discharge sensor 23 changes to "ON".

In a case where the sheet 2 is normally conveyed, the state where the signal from the sheet discharge sensor 23 is "ON" continues while the sheet 2 having the predetermined sheet length passes. After the trailing edge of the sheet 2 passes through the first flag 21, the signal from the sheet discharge sensor 23 changes back to "OFF". As in the first exemplary embodiment, the control unit determines whether to stop the conveyance of the sheet 2 (the driving of the conveyance unit by the motor M) based on whether the timing of the change of the signal from the sheet discharge sensor 23 from "ON" to "OFF" is a predetermined timing.

The output of the sheet discharge sensor 23 in one-side printing of printing an image on one side of the sheet 2 is similar to those according to the first exemplary embodiment, so that redundant descriptions thereof are omitted.

In two-sided printing of printing an image on both sides of the sheet 2, after the trailing edge of the sheet 2 goes away from the first flag 21, the output of the sheet discharge sensor 23 changes to "OFF". Then, the sheet 2 is conveyed to the re-conveyance path 43 by the reversed discharge roller 15. Consequently, the sheet 2 comes into contact with the third projection portion 32e of the second flag 32, and the second flag 32 is moved from the second retraction position to the second projection position. The output of the sheet discharge sensor 23 changes to "ON" again.

In a case where the timing at which the output of the sheet discharge sensor 23 changes to "ON" again is within a predetermined leading edge detection region (reversed), the control unit determines that the sheet 2 is normally conveyed, and the control unit continues the conveyance of the sheet 2. On the other hand, in a case where the timing at which the output of the sheet discharge sensor 23 changes to "ON" again is not within the predetermined leading edge detection region (reversed), the control unit stops the motor M and stops the conveyance unit.

As the sheet 2 is conveyed through the re-conveyance path 43, the sheet 2 goes away from the third projection portion 32e. Then, the first flag 21 is moved to the first projection position, and the second flag 32 is moved to the second retraction position. Consequently, the detected portion 32c shields the sheet discharge sensor 23. In this way, the sheet discharge sensor 23 is turned into the light-interrupted state, and the output of the sheet discharge sensor 23 changes to "OFF".

In a case where the timing at which the output of the sheet discharge sensor 23 changes to "OFF" is within a predetermined trailing edge detection region (reversed), the control unit determines that the sheet 2 is normally conveyed, and the control unit continues the conveyance of the sheet 2. On the other hand, in a case where the timing at which the output of the sheet discharge sensor 23 changes to "OFF" is not within the predetermined trailing edge detection region (reversed), the control unit stops the motor M and stops the conveyance unit. The trailing edge detection region (reversed) is set based on the sheet length of the sheet 2.

As in the first exemplary embodiment, in a case where the sheet 2 is not normally conveyed, the signal from the sheet discharge sensor 23 is changed to "OFF" at an earlier timing than the trailing edge detection region by the sheet 2 having caused a jam. In a case where the signal from the sheet discharge sensor 23 is changed to "OFF" at an earlier timing than the trailing edge detection region, the control unit determines that the sheet 2 becomes stuck, and the control unit stops the motor M and stops the conveyance unit.

As the first flag 21 and the second flag 32 are separate components, the sheet conveyance apparatus according to the present exemplary embodiment detects an abnormality in the conveyance of the sheet 2 before the time needed for the trailing edge of the sheet 2 to pass through the position of the first flag 21 in a case where the sheet 2 is accordion-folded. The sheet conveyance apparatus according to the present exemplary embodiment detects an abnormality in the conveyance of the sheet 2 in the re-conveyance path 43. As a result, the image forming apparatus 100 is stopped promptly. This prevents continuation of the jam and reduces difficulties in clearing the jam by the user. Since an instance of the sheet 2 becoming stuck in the conveyance path 42 or the re-conveyance path 43 is detectable with the single second flag 32, a space for arranging parts and cost are reduced compared to a case where flags and sensors are provided separately.

The sheet discharge sensor 23 and the second flag 22 or 32 can be arranged so that the sheet discharge sensor 23 is in the light-transmitted state in a case where the second flag 22 or 32 is at the second retraction position whereas the sheet discharge sensor 23 is in the light-interrupted state in a case where the second flag 22 or 32 is at the second projection position.

While an image is formed on the sheet 2 via the intermediate transfer belt 11 according to the present exemplary embodiment, the present disclosure is also applicable to a configuration in which the sheet 2 comes into contact with the photosensitive drum 7 to form an image on the sheet 2.

While an image forming apparatus to and from which four process cartridges are attachable and detachable is described as an example of an image forming apparatus according to the present exemplary embodiment, the present disclosure is also applicable to an image forming apparatus to and from which a single process cartridge is attachable and detachable. The present disclosure is also applicable to a configuration in which a portion corresponding to the process cartridges according to the present exemplary embodiment is fixed to an image forming apparatus. Even in this case, the present disclosure is also applicable to a configuration in which the sheet 2 comes into contact with the photosensitive drum 7 to form an image on the sheet 2.

The present disclosure provides a sheet conveyance apparatus capable of detecting an occurrence of a jam of a sheet as a recording material at an early time point.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-134772, filed Aug. 20, 2021, which is hereby incorporated by reference herein in its entirety.

What is claimed is:

1. A sheet conveyance apparatus comprising:
   a conveyance unit configured to convey a sheet through a conveyance path;
   a first moving member including a first projection portion, wherein the first moving member is movable between a first projection position where the first projection portion projects to the conveyance path and a first retraction position where the first projection portion is retracted from the first projection position, and the first moving member is configured to be moved from the first projection position to the first retraction position when the first projection portion comes into contact with the sheet;
   a second moving member including a second projection portion and configured to move relative to the first moving member, wherein the second moving member is movable between a second projection position where the second projection portion projects to the conveyance path and a second retraction position where the second projection portion is retracted from the second projection position, and the second moving member is configured to be moved from the second retraction position to the second projection position when the first moving member moves from the first projection position to the first retraction position; and
   a detection unit configured to detect a movement of the second moving member,
   wherein, in a case where the second projection portion is pushed by the sheet, the second moving member is moved from the second projection position to the second retraction position in a state where the first moving member is located at the first retraction position.

2. The sheet conveyance apparatus according to claim 1, wherein the first moving member is rotatable about a rotation axis, and the second moving member is rotatable about the rotation axis, and
   wherein a rotation direction of the first moving member in moving from the first projection position to the first retraction position and a rotation direction of the second moving member in moving from the second projection position to the second retraction position are opposite to each other when viewed along the rotation axis.

3. The sheet conveyance apparatus according to claim 1, wherein the second projection portion is disposed upstream of the first projection portion in a direction in which the sheet is conveyed in the conveyance path.

4. The sheet conveyance apparatus according to claim 1, further comprising an urging member configured to urge the first moving member and the second moving member,
   wherein the first moving member includes a supporting portion, the second moving member includes a supported portion, and the urging member is configured to urge the first moving member and the second moving member to press the supported portion against the supporting portion.

5. The sheet conveyance apparatus according to claim 4, wherein, in urging the first moving member and the second moving member, the urging member urges the first moving member and the second moving member so that the first moving member is moved from the first projection position to the first retraction position in a state where the supporting portion and the supported portion are in contact with each other.

6. The sheet conveyance apparatus according to claim 4, wherein, in a case where the second moving member is moved from the second projection position to the second retraction position in the state where the first moving member is located at the first retraction position, the supported portion is separated from the supporting portion.

7. The sheet conveyance apparatus according to claim 1, wherein an output of the detection unit changes in a case where the first moving member is moved between the first projection position and the first retraction position, and the output of the detection unit changes in a case where the second moving member is moved from the second projection position to the second retraction position in a state where the first moving member is at the first retraction position.

8. The sheet conveyance apparatus according to claim 1, further comprising a re-conveyance path configured to guide the sheet upstream on the conveyance path after the sheet passes through the conveyance path,
  wherein the second moving member includes a third projection portion projecting to the re-conveyance path, and the third projection portion is configured to come into contact with the sheet passing through the re-conveyance path.

9. The sheet conveyance apparatus according to claim 1, wherein the second projection portion is configured to come into contact with the sheet in a case where the sheet becomes stuck in the conveyance path in a state where the second moving member is located at the second projection position.

10. The sheet conveyance apparatus according to claim 1, wherein the second projection portion is located at a position away from the sheet normally conveyed in the conveyance path in a state where the second moving member is located at the second projection position.

11. The sheet conveyance apparatus according to claim 1, further comprising a control unit configured to stop the conveyance of the sheet in a case where the detection unit detects the movement of the second moving member and the detection occurs before a predetermined time passes after the sheet comes into contact with the first moving member and the detection unit detects the movement of the second moving member.

12. The sheet conveyance apparatus according to claim 1, wherein the conveyance path is located downstream of a heating portion in a direction in which the sheet is conveyed, and the heating portion is configured to heat the sheet.

13. The sheet conveyance apparatus according to claim 1, wherein the second moving member is attached to the first moving member.

14. An image forming apparatus comprising:
  the sheet conveyance apparatus according to claim 1; and
  an image forming unit configured to form an image on the sheet.

* * * * *